(12) United States Patent
Engel et al.

(10) Patent No.: US 8,913,642 B2
(45) Date of Patent: Dec. 16, 2014

(54) SLAB LASER

(71) Applicant: Rofin-Sinar Laser GmbH, Hamburg (DE)

(72) Inventors: Florian Engel, Hamburg (DE); Stefan Ruppik, Hamburg (DE); Volker Scholz, Luebeck (DE); Hermann Hage, Hamburg (DE)

(73) Assignee: Rofin-Sinar Laser GmbH, Hamburg (DE)

( * ) Notice: Subject to any disclaimer, the term of this patent is extended or adjusted under 35 U.S.C. 154(b) by 0 days.

(21) Appl. No.: 13/950,880

(22) Filed: Jul. 25, 2013

(65) Prior Publication Data

US 2013/0308673 A1    Nov. 21, 2013

Related U.S. Application Data

(63) Continuation of application No. PCT/EP2011/071281, filed on Nov. 29, 2011.

(30) Foreign Application Priority Data

Jan. 26, 2011    (DE) .......................... 10 2011 003 147

(51) Int. Cl.
| | | |
|---|---|---|
| H01S 3/22 | (2006.01) | |
| H01S 3/223 | (2006.01) | |
| H01S 3/03 | (2006.01) | |
| H01S 3/038 | (2006.01) | |
| H01S 3/08 | (2006.01) | |

(52) U.S. Cl.
CPC .............. *H01S 3/22* (2013.01); *H01S 3/08081* (2013.01); *H01S 3/2232* (2013.01); *H01S 3/0388* (2013.01); *H01S 3/0315* (2013.01)
USPC .................. 372/55; 372/56; 372/57; 372/58; 372/59; 372/60; 372/61; 372/62; 372/63; 372/64; 372/65

(58) Field of Classification Search
CPC ...... H01S 3/2232; H01S 3/0315; H01S 3/041; H01S 3/038; H01S 3/22; H01S 3/08081; H01S 3/086; H01S 3/0818; H01S 3/0813; H01S 3/0973; H01S 3/097
USPC ...................................................... 372/55–65
See application file for complete search history.

(56) References Cited

U.S. PATENT DOCUMENTS

| 4,719,639 A | 1/1988 | Tulip |
|---|---|---|
| 4,875,218 A | 10/1989 | Hongo et al. |

(Continued)

FOREIGN PATENT DOCUMENTS

| EP | 0305893 A2 | 3/1989 |
|---|---|---|
| EP | 0444442 A2 | 9/1991 |
| WO | 2011154272 A1 | 12/2011 |

OTHER PUBLICATIONS

Teuma, et al., "Mode selectivity using selective layered and combined metallic-dielectric electrodes in slab waveguide resonators", Proc. SPIE 4184, XIII International Symposium on Gas Flow and Chemical Lasers and High-Power Laser Conference, Florence, Italy, 286 (Jan. 25, 2001); doi:10.1117/12.414072, pp. 286-290.

*Primary Examiner* — Colleen A Matthews
*Assistant Examiner* — Delma R Forde
(74) *Attorney, Agent, or Firm* — Laurence A. Greenberg; Werner H. Stemer; Ralph E. Locher

(57) ABSTRACT

In a slab laser, a gas mixture containing carbon dioxide $CO_2$ is formed as a laser-active medium in a discharge space which is formed between two plate-shaped metal electrodes, the flat faces of which are located opposite one another. A resonator mirror is arranged on each of the mutually opposite end faces of the discharge space, the mirrors forming an unstable resonator parallel to the flat faces. At least one of the mutually facing flat faces is provided either on the entire flat face with a dielectric layer the thickness of which is greater on at least one sub-surface than in the remaining area of the flat face, or the at least one flat face is provided with a dielectric layer exclusively on at least one sub-surface.

18 Claims, 3 Drawing Sheets

(56) References Cited

U.S. PATENT DOCUMENTS

| | | | |
|---|---|---|---|
| 4,939,738 A | 7/1990 | Opower | |
| 5,088,102 A | 2/1992 | Krueger et al. | |
| 5,155,739 A * | 10/1992 | Mefferd | 372/107 |
| 5,271,029 A * | 12/1993 | Seiffarth et al. | 372/64 |
| 5,353,299 A * | 10/1994 | Martinen et al. | 372/99 |
| 5,373,528 A * | 12/1994 | Kuzumoto et al. | 372/87 |
| 5,379,317 A * | 1/1995 | Bridges et al. | 372/64 |
| 5,479,428 A | 12/1995 | Kuzumoto et al. | |
| 6,442,186 B1 * | 8/2002 | Vitruk | 372/95 |
| 6,856,639 B2 * | 2/2005 | Dutov et al. | 372/61 |
| 8,331,416 B2 * | 12/2012 | Hage et al. | 372/87 |
| 2005/0069008 A1 * | 3/2005 | Xin et al. | 372/64 |
| 2010/0118898 A1 | 5/2010 | Markillie et al. | |
| 2012/0236897 A1 | 9/2012 | Hage et al. | |

* cited by examiner

SLAB LASER

CROSS-REFERENCE TO RELATED APPLICATION

This application is a continuation, under 35 U.S.C. §120, of copending international application No. PCT/EP2011/071281, filed Nov. 29, 2011, which designated the United States; this application also claims the priority, under 35 U.S.C. §119, of German patent application No. DE 10 2011 003 147.2, filed Jan. 26, 2011; the prior applications are herewith incorporated by reference in their entireties.

BACKGROUND OF THE INVENTION

Field of the Invention

The invention relates to a slab laser such as is known, for example, from European patent EP 0 305 893 A2, corresponding to U.S. Pat. No. 4,939,738, or U.S. Pat. No. 4,719,639.

Such a slab laser or stripline laser is a laser whose resonator is a combination of a waveguide resonator and an unstable resonator of the positive or negative branch. In the case of such a slab laser, a gas mixture containing carbon dioxide $CO_2$ is situated in a narrow discharge space formed between two flat plate-type electrodes. The gas mixture situated between the electrodes is excited by the application of a high-frequency electromagnetic field. A resonator mirror is respectively arranged opposite the end faces of the narrow parallelepipedal discharge space formed in this way. In a direction parallel to the narrow side of the discharge space, the resonator mirrors form an unstable confocal resonator with free beam propagation. Transversely with respect to the direction, the propagation conditions of the electromagnetic radiation arising within the discharge space are defined by the waveguide properties of the electrodes.

In such a laser, the beam distribution in the direction of the unstable axis, i.e. parallel to the electrodes and to the end face of the discharge space, is substantially defined by the geometry of the resonator mirrors. In the waveguide axis perpendicular to the unstable axis, the surfaces of the electrodes as a delimiting wall of the waveguide have a crucial influence on the formation of the beam distribution in this direction. The properties of the surface, i.e. the roughness thereof and the material of which they consist, and the mutual distance between them determine which resonator mode finds the most favorable propagation conditions.

The electrodes are formed from a metal or a dielectric material. In U.S. Pat. No. 4,719,639, an electrically conductive metal, for example aluminum, or a dielectric, for example aluminum oxide $Al_2O_3$, is mentioned as a suitable material for the electrodes, wherein, in the latter case, an electrically conductive metal has to be arranged on the side facing away from the discharge space.

It is also known from European patent EP 0 444 442 A2, corresponding to U.S. Pat. No. 5,088,102, to provide the electrodes formed from aluminum, on their surfaces facing the discharge space, with a layer which consists of aluminum oxide $Al_2O_3$ and which serves for damping higher waveguide modes. However, the application of a damping layer which is precisely reproducible and defined with regard to its optical properties proves to be very problematic for slab lasers in the multi-kilowatt range with extensive electrode areas.

The influence of a dielectric coating of those surfaces of the electrodes which face the discharge space on the damping of the waveguide modes propagating in a cavity delimited by the electrodes is also known for conventional waveguide lasers for example from U.S. Pat. No. 4,875,218.

SUMMARY OF THE INVENTION

Therefore, the invention is based on the object of specifying a slab laser having metallic electrodes in which the above-mentioned problems are largely avoided.

The stated object is achieved according to the invention by a slab laser. In accordance with these features, in the case of a slab laser, a gas mixture containing carbon dioxide $CO_2$ is situated as a laser-active medium between two plate-type metallic electrodes, which are situated with their flat sides opposite one another and which define a discharge space. At the end sides of the discharge space situated opposite one another a resonator mirror is respectively arranged, which form an unstable resonator parallel to the flat sides. At least one of the flat sides facing one another is provided either with a dielectric layer exclusively on at least one partial area or with a dielectric layer on the entire flat side, wherein, in this case, the thickness of the dielectric layer is greater on at least one partial area than in the remaining region of the flat side.

In this case, the invention is based on the insight that, for suppressing undesirable modes, it suffices, in principle, to provide only a part of at least one of the flat sides facing one another, i.e. not the entire flat side of one of the electrodes, with a thick dielectric layer if the layer thickness thereof is greater than the thickness which would be required for a dielectric layer which brings about the same damping and which is applied on the entire flat side. Accordingly, it is sufficient to provide only a partial area with a dielectric layer, which, on account of the smaller area extent of the partial area, can be applied to the electrode more simply and in a more precisely reproducible manner. This can be done either by providing exclusively one partial area with a dielectric layer, i.e. by not coating the remaining region of the flat side. Particularly in the high-power range, however, it is necessary, in order to avoid flashovers between the electrodes, to provide a dielectric coating on the entire flat side. In this case, it has been found that for this purpose it suffices to coat the flat side with a dielectric layer whose thickness is less than the thickness of the layer which would be required for effective suppression of higher modes. In this case, therefore, the invention provides for making the dielectric layer thicker only on a partial area than in the remaining region of the flat side.

Accordingly, for the present application the term "partial area" should be understood to mean either an area region in which the dielectric layer is thicker than in the other regions of the flat side, or else an area region which as the sole region of the flat side has a dielectric layer.

In practice, approximately 3 to 7 μm has proved to be a suitable layer thickness for these partial areas, while the remaining region either is not coated or else, for high-power lasers having an output power in the kW range, is provided with a layer having a layer thickness of at most 2 μm. Preferably, aluminum oxide $Al_2O_3$ or silicon dioxide $SiO_2$ is provided as dielectric layer.

The advantageous embodiments specified in the dependent claims are in this case based on the additional consideration that, on the mutually facing flat sides of the electrodes, there are regions or partial areas which, although they occupy only a part of the total area, nevertheless make a greater contribution to the damping of undesirable waveguide modes than other regions of the flat sides.

If a confocal negative branch resonator having a focus situated within the discharge space is provided as the resonator, the at least one partial area covers the focus, such that the latter is situated within the at least one partial area.

Other features which are considered as characteristic for the invention are set forth in the appended claims.

Although the invention is illustrated and described herein as embodied in a slab laser, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
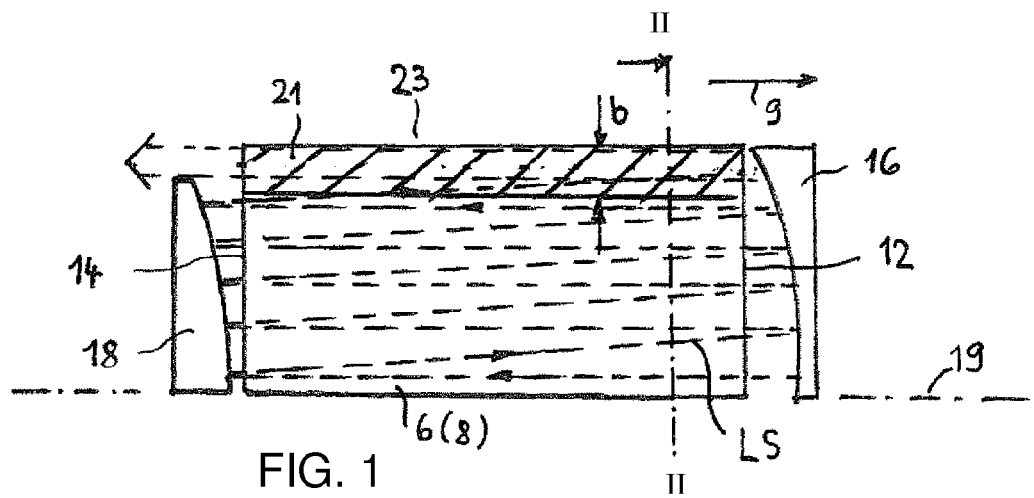
FIG. 1 is a diagrammatic, plan view of a slab laser or a stripline laser, in which laser a partial area of at least one electrode is provided with a dielectric layer and is highlighted by hatching according to the invention.
Figure 2:
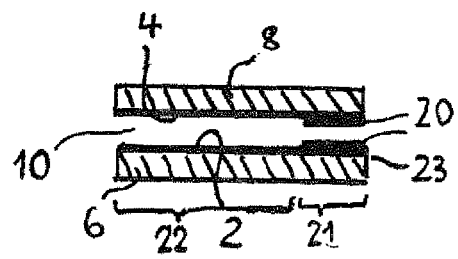
FIG. 2 is a diagrammatic, cross-sectional view parallel to an end side of the electrode and taken along the section line II-II shown in FIG. 1.

Referring now to the figures of the drawing in detail and first, particularly, to FIGS. 1 and 2 thereof, there is shown a slab laser or stripline laser according to the invention which contains two plate-type metallic electrodes 6, 8, which are situated with their flat sides 2, 4 opposite one another and which define a discharge space 10 extended in a longitudinal direction 9, a gas mixture containing carbon dioxide $CO_2$ as a laser-active medium being situated in the discharge space. At end sides 12, 14 of the discharge space 10 situated opposite one another, a resonator mirror 16, 18 is respectively arranged. The two resonator mirrors 16, 18 form an unstable resonator in a plane oriented parallel to the flat sides of the electrodes 6, 8. In the example illustrated, the resonator is a confocal unstable resonator of the positive branch, the focus of which is situated outside the resonator, i.e. outside the space defined by the resonator mirrors 16, 18 on a resonator axis 19 running parallel to the longitudinal direction, the resonator axis being depicted in FIG. 1. A laser beam LS propagating between the resonator mirrors 16, 18 is coupled out at the lateral edge of one of the end faces, the end face 14 in the example.

The electrodes 6, 8 are provided with a dielectric layer 20 on their flat sides 2, 4 facing one another, which dielectric layer is thicker on a partial area 21, highlighted by hatching in FIG. 1, than in a remaining region 22 and is situated at the lateral coupling-out edge 23, i.e. in the region of the longitudinal side of the electrodes 6, 8, at which the laser beam LS emerges from the discharge space 10 parallel to the longitudinal direction 9, and extends over the entire length between the end sides 12 and 14 respectively situated opposite one another. In the example, the partial area 21 has a rectangular shape and its width b corresponds approximately to the width of the coupled-out laser beam LS.

In the exemplary embodiment, both electrodes 6, 8 are in each case provided with such a dielectric layer 20 on their entire area and both electrodes 6, 8 have a partial area 21 in which the coating is thicker than in the remaining region 22. In principle, an embodiment is also possible in which only the partial area 21 of one electrode or the partial areas of both electrodes is/are coated or in which both electrodes are provided with a dielectric layer 20 on their entire flat side but only one of the electrodes has such a more thickly coated partial area 20.

Figure 3:
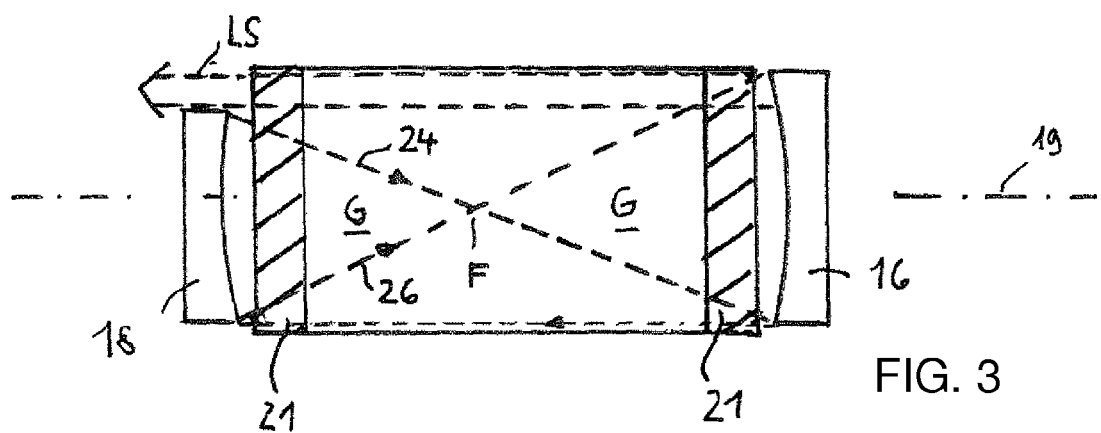
FIGS. 3 to 8 are diagrammatic, plan views showing further embodiments of the slab laser according to the invention in each case, with coated partial areas likewise highlighted by hatching.

In the exemplary embodiment in accordance with FIG. 3, two concavely curved resonator mirrors 16, 18 are provided, such that a confocal resonator of the negative branch is formed, the common focus F of which lies within the resonator formed by the resonator mirrors 16, 18. The focus F is a line focus extending perpendicular to the flat sides between the electrodes 6, 8. In such a resonator, the laser beam LS propagates principally within a zone G delimited by the marginal rays 24, 26 depicted in FIG. 3.

In the exemplary embodiment illustrated, two partial areas 21 are provided with a thicker dielectric layer, which are situated opposite one another in each case at the end-side edge of the flat side. Such an embodiment is also suitable for the positive branch resonator illustrated in FIG. 1.

In this exemplary embodiment, too, once again both electrodes 6, 8 can be provided with such a thicker dielectric layer at the respectively opposite end sides. In this exemplary embodiment, too, for slab lasers having low output powers, a coating can be provided exclusively in the partial areas 21 of at least one of the electrodes 6, 8.

Figure 4:
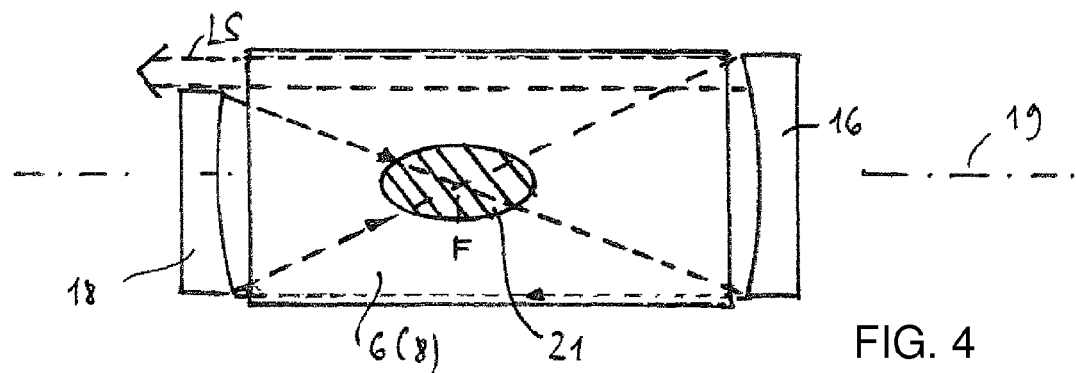

In the exemplary embodiment in accordance with FIG. 4, in the case of a negative branch resonator, the partial area 21 is situated exclusively in an inner zone surrounding the focus F, i.e. a zone at a distance from the lateral edge regions of the electrodes 6, 8.

Figure 5:
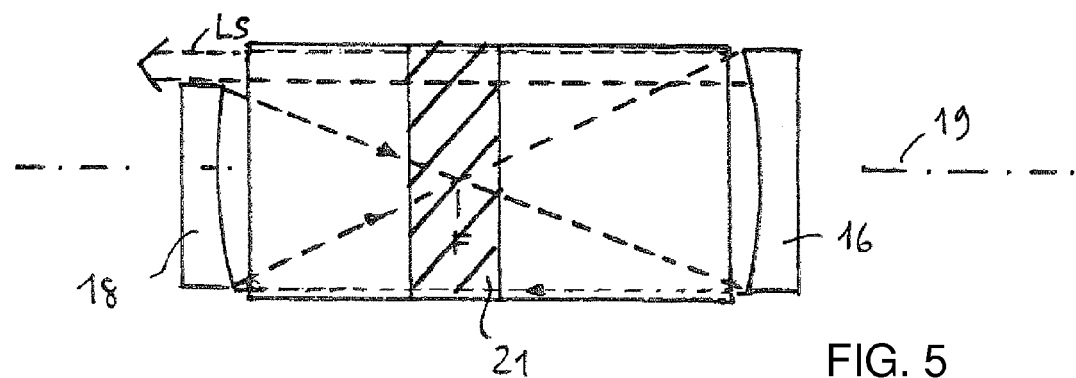
Figure 6:
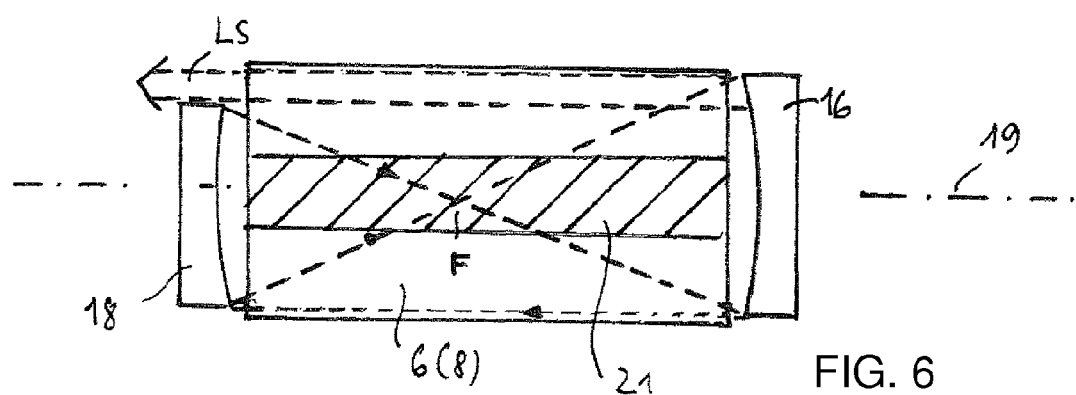

In the exemplary embodiments in accordance with FIGS. 5 and 6, provision is made of partial areas 21 which cover the focus F and either extend as a narrow strip, running in a transverse direction, i.e. parallel to the end sides, as far as the mutually opposite longitudinal sides (FIG. 5) or are arranged as a narrow strip, running in the longitudinal direction, between the mutually opposite end sides (FIG. 6).

Figure 7:
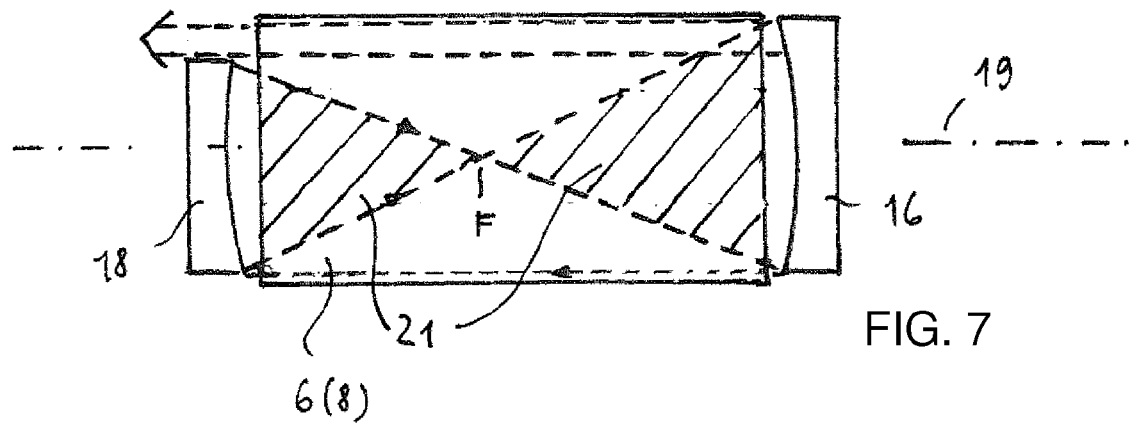

In the exemplary embodiment in accordance with FIG. 7, the partial area 21 is limited to the triangular zones within which the laser beam LS principally propagates within the resonator.

Figure 8:
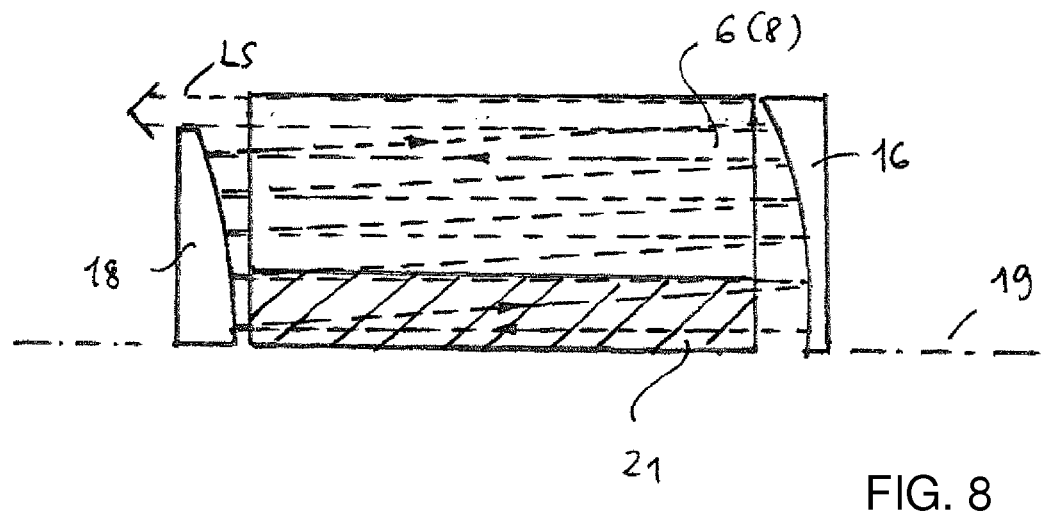

FIG. 8 shows an embodiment with a positive branch resonator, in which embodiment the partial areas 21 are situated at the lateral edge of the electrodes 6, 8 at which the resonator axis 19 runs.

As an alternative to the partial areas which extend in each case as far as the edges of the electrodes and are illustrated in the exemplary embodiments in accordance with FIGS. 1, 2, 3, 5 to 7, it is also possible, in principle, to provide partial areas which are at a distance from the edges. It is likewise possible to provide topological structures which deviate from the rectangular or triangular forms principally illustrated. Furthermore, the exemplary embodiments respectively illustrated in FIGS. 1, 3 to 7 and in FIGS. 1, 3 and 8 can also be combined with one another.

The invention claimed is:
1. A slab laser, comprising:
two plate-type metallic electrodes having flat sides disposed opposite one another and defining a discharge space, and end sides disposed opposite one another;

a gas mixture containing carbon dioxide $CO_2$ as a laser-active medium disposed between said two plate-type metallic electrodes;

resonator mirrors, one of said resonator mirrors disposed at each of said end sides of said two plate-type metallic electrodes, said resonator mirrors forming an unstable resonator parallel to said flat sides; and a dielectric layer, wherein at least one of said flat sides facing one another is provided with said dielectric layer on an entire area of said one flat side, a thickness of said dielectric layer being greater on at least one partial area than in a remaining region of said one flat side, said thickness extending toward said flat side of the other one of said plate-type metallic electrodes and said thickness being less than a distance separating said flat sides of said plate-type metallic electrodes from one another and said dielectric layer assisting in selectively suppressing of undesired modes.

2. The slab laser according to claim 1, wherein said at least one partial area is situated at an end-side edge of said one flat side.

3. The slab laser according to claim 2, wherein said partial area extends as far as mutually opposite longitudinal sides of said plate-type metallic electrode.

4. The slab laser according to claim 3, wherein said at least one partial area is situated at a coupling-out edge of said flat side.

5. The slab laser according to claim 4, wherein said partial area extends as far as said mutually opposite end sides.

6. The slab laser according to claim 3, wherein said unstable resonator is a confocal negative branch resonator having a focus situated within said discharge space, and wherein the focus lies within said at least one partial area.

7. The slab laser according to claim 6, wherein said partial area is disposed within said flat side.

8. The slab laser according to claim 6, wherein said partial area extends as far as said mutually opposite longitudinal sides of said plate-type metallic electrode.

9. The slab laser according to claim 6, wherein said partial area extends as far as mutually opposite end sides.

10. A slab laser, comprising:

two plate-type metallic electrodes having flat sides disposed opposite one another and defining a discharge space, and end sides disposed opposite one another;

a gas mixture containing carbon dioxide $CO_2$ as a laser-active medium disposed between said two plate-type metallic electrodes;

resonator mirrors, one of said resonator mirrors disposed at each of said end sides of said two plate-type metallic electrodes, said resonator mirrors forming an unstable resonator parallel to said flat sides; and a dielectric layer, wherein at least one of said flat sides facing one another is provided with said dielectric layer exclusively on at least one partial area of said one flat side, wherein a thickness of said dielectric layer being less than a distance separating said flat sides of said plate-type metallic electrodes from one another and said dielectric layer assisting in selectively suppressing of undesired modes.

11. The slab laser according to claim 10, wherein said at least one partial area is situated at an end-side edge of said one flat side.

12. The slab laser according to claim 11, wherein said partial area extends as far as mutually opposite longitudinal sides of said plate-type metallic electrode.

13. The slab laser according to claim 12, wherein said at least one partial area is situated at a coupling-out edge of said flat side.

14. The slab laser according to claim 13, wherein said partial area extends as far as said mutually opposite end sides.

15. The slab laser according to claim 12, wherein said unstable resonator is a confocal negative branch resonator having a focus situated within said discharge space, and wherein the focus lies within said at least one partial area.

16. The slab laser according to claim 15, wherein said partial area is disposed within said flat side.

17. The slab laser according to claim 15, wherein said partial area extends as far as said mutually opposite longitudinal sides of said plate-type metallic electrode.

18. The slab laser according to claim 15, wherein said partial area extends as far as mutually opposite end sides.

* * * * *